United States Patent
Pirzada et al.

(10) Patent No.: US 7,590,075 B2
(45) Date of Patent: Sep. 15, 2009

(54) SYSTEMS AND METHODS FOR MANAGING WIRELESS COMMUNICATION

(75) Inventors: Fahd B. Pirzada, Austin, TX (US); Liam B. Quinn, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 445 days.

(21) Appl. No.: 11/106,779

(22) Filed: Apr. 15, 2005

(65) Prior Publication Data

US 2006/0233191 A1    Oct. 19, 2006

(51) Int. Cl.
*H04L 12/28* (2006.01)
*H04L 12/66* (2006.01)

(52) U.S. Cl. ....................... 370/254; 370/463
(58) Field of Classification Search .................. 370/254, 370/463
See application file for complete search history.

(56) References Cited

U.S. PATENT DOCUMENTS

| | | | |
|---|---|---|---|
| 5,930,368 A | 7/1999 | Hocker et al. | |
| 6,067,076 A | 5/2000 | Hocker et al. | |
| 6,072,468 A | 6/2000 | Hocker et al. | |
| 6,088,752 A | 7/2000 | Ahern | |
| 6,590,767 B2 | 7/2003 | Liao et al. | |
| 6,804,740 B1 | 10/2004 | Watts, Jr. | |
| 2003/0067743 A1 | 4/2003 | Liao et al. | |
| 2004/0100923 A1* | 5/2004 | Yam | 370/328 |
| 2005/0013103 A1 | 1/2005 | Chandley | |
| 2005/0239497 A1* | 10/2005 | Bahl et al. | 455/552.1 |
| 2006/0116160 A1* | 6/2006 | Fuccello | 455/556.1 |
| 2006/0182101 A1* | 8/2006 | Hoekstra et al. | 370/389 |
| 2006/0193295 A1* | 8/2006 | White et al. | 370/336 |
| 2006/0221998 A1* | 10/2006 | Livet et al. | 370/464 |

OTHER PUBLICATIONS

Livet, Provisional Application entitled "Method and System for Dynamic Link Selection", U.S. Appl. No. 60/667,173 filed Mar. 31, 2005, 17 pgs.

\* cited by examiner

*Primary Examiner*—Barry W Taylor
(74) *Attorney, Agent, or Firm*—O'Keefe, Egan, Peterman & Enders LLP

(57) ABSTRACT

Systems and methods for managing wireless communication between information handling system/s and one or more peripherals or other external devices, and that may be implemented in one embodiment to provide a virtual wireless docking environment for a portable information handling system and associated wired and wireless attached devices and peripherals.

31 Claims, 6 Drawing Sheets

SYSTEMS AND METHODS FOR MANAGING WIRELESS COMMUNICATION

BACKGROUND OF THE INVENTION

1. Field of the Invention

This invention relates generally to networks, and more particularly to managing wireless communication between host information handling system/s and one or more peripherals or other devices in a networking environment.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems in the form of notebook computers enjoy widespread use today. The portability of these devices allow them to be employed in fixed locations (e.g., home, office, etc.) as well as in mobile environments (e.g., airplane, automobile, train, etc.) A docking station is often employed as a cable replacement mechanism at fixed locations for facilitating I/O and peripheral connectivity to a notebook computer and the applications executing thereon. Such a docking station requires a notebook computer platform to mechanically and electrically engage or 'dock' with the docking station to engage attached peripherals (e.g., projector, printer, etc.) and I/O devices (e.g., mouse, keyboard, external display, etc.). While docked in the docking station, applications executing on the notebook computer make wired connection with external I/O devices (such as external mouse and external keyboard) through the docking station in a transparent manner such that the applications executing on the notebook computer operate as if communicating with devices internal to the notebook computer (such as integrated touchpad and integrated keyboard).

Docking system architectures have been developed for portable information handling systems such as notebook computers and personal data assistants (PDAs). FIG. 1 illustrates a typical conventional docking configuration in which a portable information handling system 100 configured as a notebook computer makes mechanical and electrical connection with a conventional docking station 102 via a mechanical docking mechanism 104 that includes electrical connectors. Docking station 102 in turn makes wired connection with various peripherals. In FIG. 1, docking station 102 makes wired connection 110 with television 120, wired connection 112 with router/access point 130, wired connection 114 with cable/satellite television source 132, and wired connection 116 with wired I/O device 134. Wired connection between portable information handling system 100 and these devices is enabled when portable information handling system 100 is docked in docking station 102.

Still referring to FIG. 1, portable information handling system 100 may also make wireless connection directly (i.e., independently of docking station 102) with one or more wireless communication enabled devices, enabling communication with these devices when portable information handling system 100 is not docked with docking station 102. In FIG. 1, portable information handling system 100 is shown making a single active wireless connection 120 with router/access point 130 while docked with docking station 102. In this docked condition, wireless connection 122 with cable modem 140 and wireless connection 124 with wireless I/O devices 142 are both inactive as shown. As further shown in FIG. 1, cable modem 140 makes wired connection 118 with television 120 and makes wireless connection 123 with router/access point 130. Router/access point 130 is in communication with broadband Internet source 150 via wired connection 119, and is in communication with a second portable information handling system 101 via wireless connection 125.

Portable information handling systems may be implemented as wireless devices that communicate with peripherals and other information handling systems using wireless networking and Personal Area Network (PAN) technologies such as IEEE 802.1x, Ultra-Wide Band (UWB), IEEE 802.15.3, Bluetooth (BT), etc. For example, UWB has emerged as a high speed Personal Area Network technology that may be considered for short range wireless links between devices for bandwidth intensive applications like video, audio and I/O interconnectivity. UWB is a high speed point-to-point wireless personal area network architecture, capable of 480 Mbps data rate at the low end scaling to 1 Gbps at the high end over short distances. However, wireless communication with peripherals using current and emerging wireless technologies requires an information handling system user (or application executing on the portable information handling system) to choose a peripheral and the proper wireless communication technology for communication with the chosen peripheral.

SUMMARY OF THE INVENTION

Disclosed herein are systems and methods for managing wireless communication between information handling system/s and one or more peripherals or other external devices. The disclosed systems and methods may be implemented in one embodiment to provide a virtual wireless docking environment for a portable information handling system (e.g., a mobile wireless computing platform such as a notebook computer) and associated wired and wireless attached devices and peripherals. Such a virtual docking environment may be utilized to allow a portable information handling system to be used for purposes of implementing computing and I/O connectivity tasks, and/or to communicate with wireless peripherals and other devices that reduce or substantially eliminate the cable management challenges that may be encountered in networking environments, such as in the office workspace and in the Digital Home.

In the practice of the disclosed systems and methods, wireless docking capabilities of portable information handling system may be implemented by, for example, incorporating a wireless docking manager (e.g., docking layer) on top of both wired and wireless network interfaces of the portable information handling system. In such an embodiment, the wireless docking manager may be implemented to provide seamless connectivity for applications executing on the portable information handling system by providing a single or common point of contact for each application to various network interfaces. This capability may be implemented in a manner that provides application transparency so that individual applications are not required to maintain or manage individual network interfaces, but at the same time are allowed to select among available external devices for connection and communication. Because the wireless docking manager manages interface operations with external devices, it may also be configured to authenticate such devices across one or more interfaces, and to provide a secure interface for the application layer. Examples of network docking layer functionalities that may be implemented by a wireless docking manager include, but are not limited to, maintenance of authentication information for external docking devices on a network, maintenance of connection status for devices connected through one or more network interfaces, maintenance of bandwidth availability data for devices connected through one or more network interfaces, providing active feedback to an application layer about device and network interface statistics, combinations thereof, etc.

In one exemplary embodiment, the disclosed systems and methods may be implemented to enable wireless delivery of multimedia content, for example, throughout a networking environment such as a home. This capability may be enabled, for example, by facilitating aggregation and simultaneous usage of multiple networks by a portable information handling system so that available bandwidth may be utilized efficiently. The disclosed systems and methods may be advantageously implemented in another exemplary embodiment to enable integration of modern high speed wireless technology to address needs of a mobile docking and wireless desktop environment without requiring any physical contact. In one example, a portable information handling system, such as a notebook computer, may be implemented as the hub of multiple wireless peripherals and/or other devices, and to support high definition television (HDTV)-quality I/O bandwidths. Alternatively, or at the same time, a portable information handling system may also be implemented in a manner that maintains seamless links with multiple wireless networks, e.g., in the digital home.

In one respect, disclosed herein is an information handling system including communication processing components, the communication processing components including a wireless docking manager.

In another respect, disclosed herein is an information handling system including communication processing components, the communication processing components including: an application layer; a network interface layer; and a wireless docking manager communicating between the application layer and the network interface layer.

In another respect, disclosed herein is a method of managing communication between one or more applications and two or more network interface components using a wireless docking manager; wherein the one or more applications and the two or more network interface components include communication processing components of an information handling system.

DESCRIPTION OF ILLUSTRATIVE EMBODIMENTS

Figure 1:
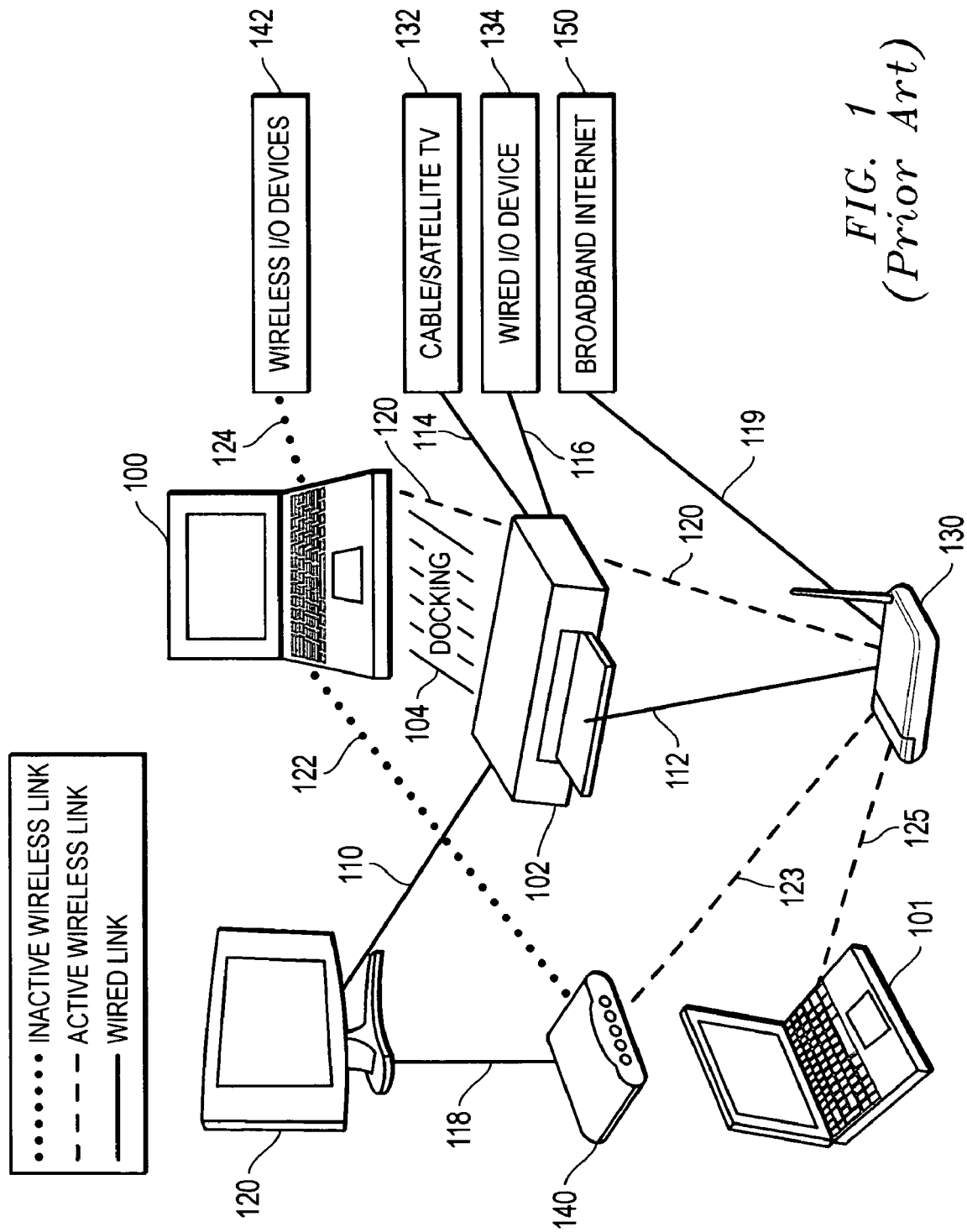
FIG. 1 is a simplified block diagram of a conventional docking configuration.
Figure 2:
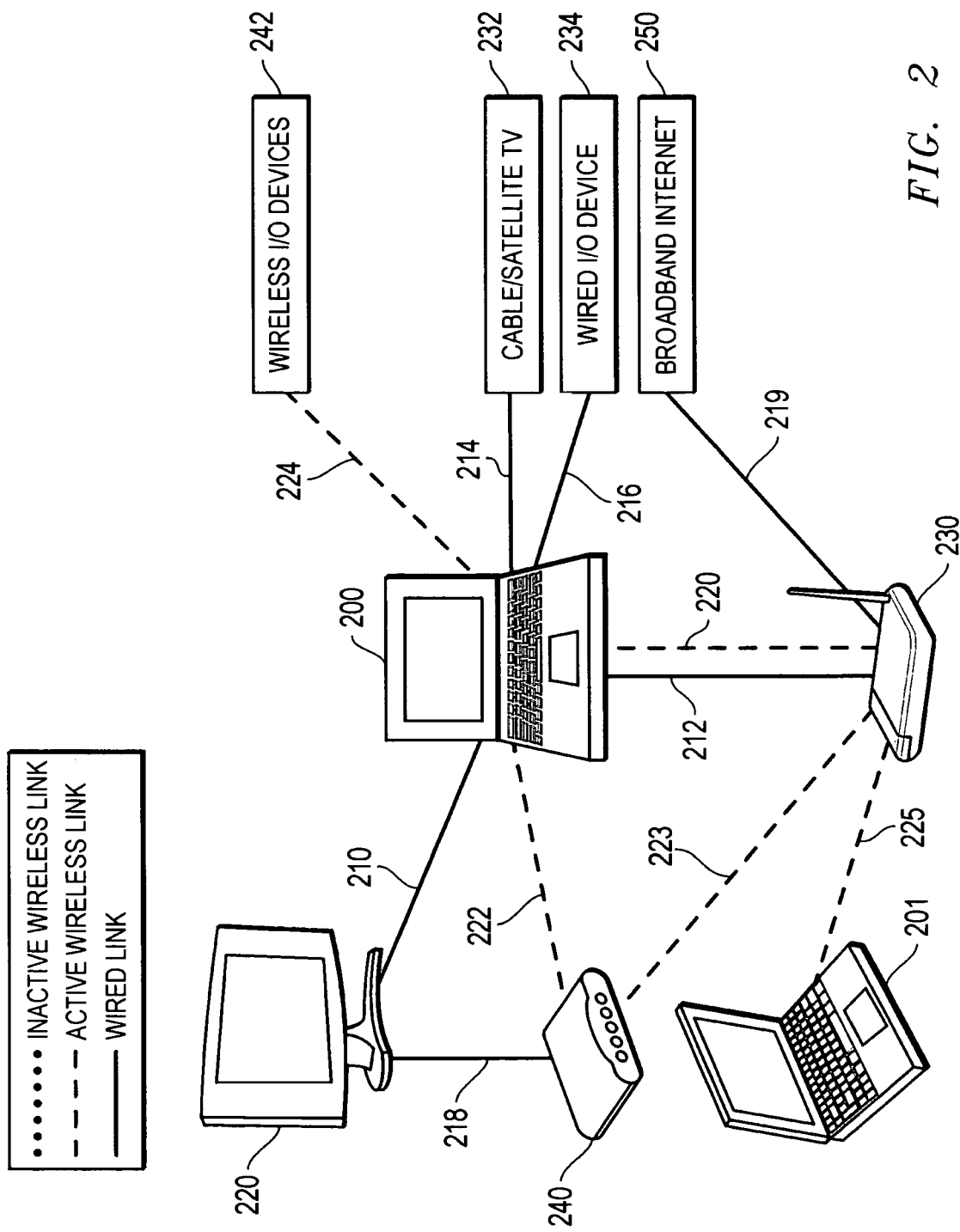
FIG. 2 is a simplified block diagram of a docking architecture according to one exemplary embodiment the disclosed systems and methods.

FIG. 2 illustrates a virtual docking architecture as it may be implemented according to one exemplary embodiment of the disclosed systems and methods using a portable information handling system 200 in combination with various associated wired and wireless-attachable peripherals and other external devices. In this embodiment, these various wired and wireless external devices/peripherals together create a heterogeneous network environment (i.e., network environment that includes two or more different available networking technologies that may have different communication ranges and/or bandwidth capabilities) in which portable information handling system 200 operates. As will be described further herein, the disclosed virtual docking architecture may be implemented to manage connections between the external devices and an information handling system in response to changing network connection availability and/or characteristics (e.g., bandwidth, connection quality, etc.). Changes in connection availability and/or connection characteristics may result, for example, due to physical movement of one or more external devices and a given information handling system relative to each other, interference from external sources, movement of an information handling system from a first network environment to a second or overlapping network environment (roaming), etc.

In the illustrated embodiment of FIG. 2, portable information handling system 200 is configured as a virtual docking station that communicates via a wireless interface with peripheral I/O devices 242 (e.g., optical drives, external storage devices, displays, mice, keyboards, printers, projectors, webcams, etc). Portable information handling system 200 may also be capable of communicating via wireless interface with various networks (WLAN, WPAN, WWAN, cellular, etc.), and may be capable of communicating using wireless interface for ad-hoc connections with various media devices (e.g., in one exemplary embodiment providing support for HDTV streams of from about 25 to about 34 Mbps). In this regard, portable information handling system 200 may be advantageously configured in one exemplary embodiment as a virtual docking station that is capable of managing connectivity on multiple simultaneous active wireless links using one interface, e.g., in FIG. 2 wireless connections 220, 222 and 224 are all active. Although FIG. 2 illustrates a wireless docking architecture implemented on a portable information handling system configured as a notebook computer, it will be understood that the disclosed systems and methods may be implemented on information handling systems of other configurations including, but not limited to, non-portable desktop personal computers (PCs), PDAs, etc.

Referring to the exemplary embodiment of FIG. 2 in greater detail, portable information handling system 200 makes wired connection 210 (e.g., S-Video Interface, Digital Visual Interface DVI, etc.) with television 220, wired connection 212 (e.g., Ethernet) with router/access point 230, wired connection 214 (e.g., Coaxial Cable, Video Component Cable, S-Video Cable etc.) with cable/satellite television source 232, and wired connection 216 (e.g., USB, Serial Port RS-232, Parallel Port, etc.) with wired I/O device 234. It will be understood that the illustrated configuration is exemplary only, and that any one or more of these wired connections may alternatively be wireless connections. For example, wired connection 210 may alternatively be a wireless connection (e.g., UWB, etc.), and wired connections 214 and 216 may alternatively be wireless connections (e.g., UWB, 802.11, Bluetooth, etc.).

Still referring to FIG. 2, portable information handling system 200 also makes wireless connection with one or more wireless communication enabled devices. For example, portable information handling system 200 makes wireless connection 220 (e.g., IEEE 802.11n) with router/access point 230, makes wireless connection 222 (e.g., UWB, etc.) with cable modem 240, and makes wireless connection 224 (e.g., Bluetooth, Wireless USB, etc.) with wireless I/O devices 242. As further shown in FIG. 2, cable modem 240 makes wired connection 218 with television 220 and makes wireless connection 223 (e.g., IEEE 802.11n) with router/access point 230. Router/access point 230 is shown in communication with broadband Internet source 250 via wired connection 219, and is in communication with a second portable information handling system 201 via wireless connection 225 (e.g., IEEE 802.11n, etc.).

It will be understood that the illustrated wired and wireless connections of FIG. 2 are exemplary only, and that a portable information handling system 200 may make other combinations of wired and wireless connections as desired or needed to fit the requirements of a particular networking environment. Furthermore, it will also be understood that any combination of one or more wireless connection technologies (e.g., UWB, 802.11n, etc.) may be employed that is suitable for establishing wireless communication between any of the devices of FIG. 2 that are capable of wireless communication. In this regard, UWB offers a unique set of characteristics that may make it desirable for certain wireless docking applications. These characteristics include relatively low power and relatively low cost implementation that is well suited for some mobile devices. UWB also possesses relatively high data rates (i.e., from about 480 Mbps and scaling upward to multi-Gbps) that may be implemented to support connectivity that is similar to a USB 2.0 connection. UWB utilizes a relatively low noise, wide frequency band (i.e., from about 3.1 GHz to about 10.6 GHz) that may be implemented in a manner that helps reduce or substantially eliminate interference issues with WLAN deployments. UWB may also be implemented in a manner that offers efficient spectrum reuse capability due to relatively short range (i.e., about 10 meters)

Still referring to FIG. 2, wireless docking capabilities of portable information handling system 200 may be implemented in one exemplary embodiment by incorporating a wireless docking manager on top of both wired and wireless network interfaces (e.g., UWB, 802.11a/g/n, BT, USB and Ethernet) of portable information handling system 200. As will be described further herein, such a wireless docking manager may not only be implemented to provide basic docking functionality, but also in a manner that provides one or more additional features that include, but are not limited to, seamless connectivity, application transparency, and/or authentication and security. In this regard, the wireless docking manager may be implemented to provide seamless connectivity for applications executing on portable information handling system 200 by providing a single or common point of contact for each application to various network interfaces. This capability may be implemented in a manner that provides application transparency so that individual applications are not required to maintain or manage individual network interfaces, but at the same time are allowed to manage or select among available external devices for connection and communication. Because the wireless docking manager manages interface operations with external devices, it may also be configured to authenticate such devices across one or more interfaces, and to provide a secure interface for the application layer.

Figure 3A:
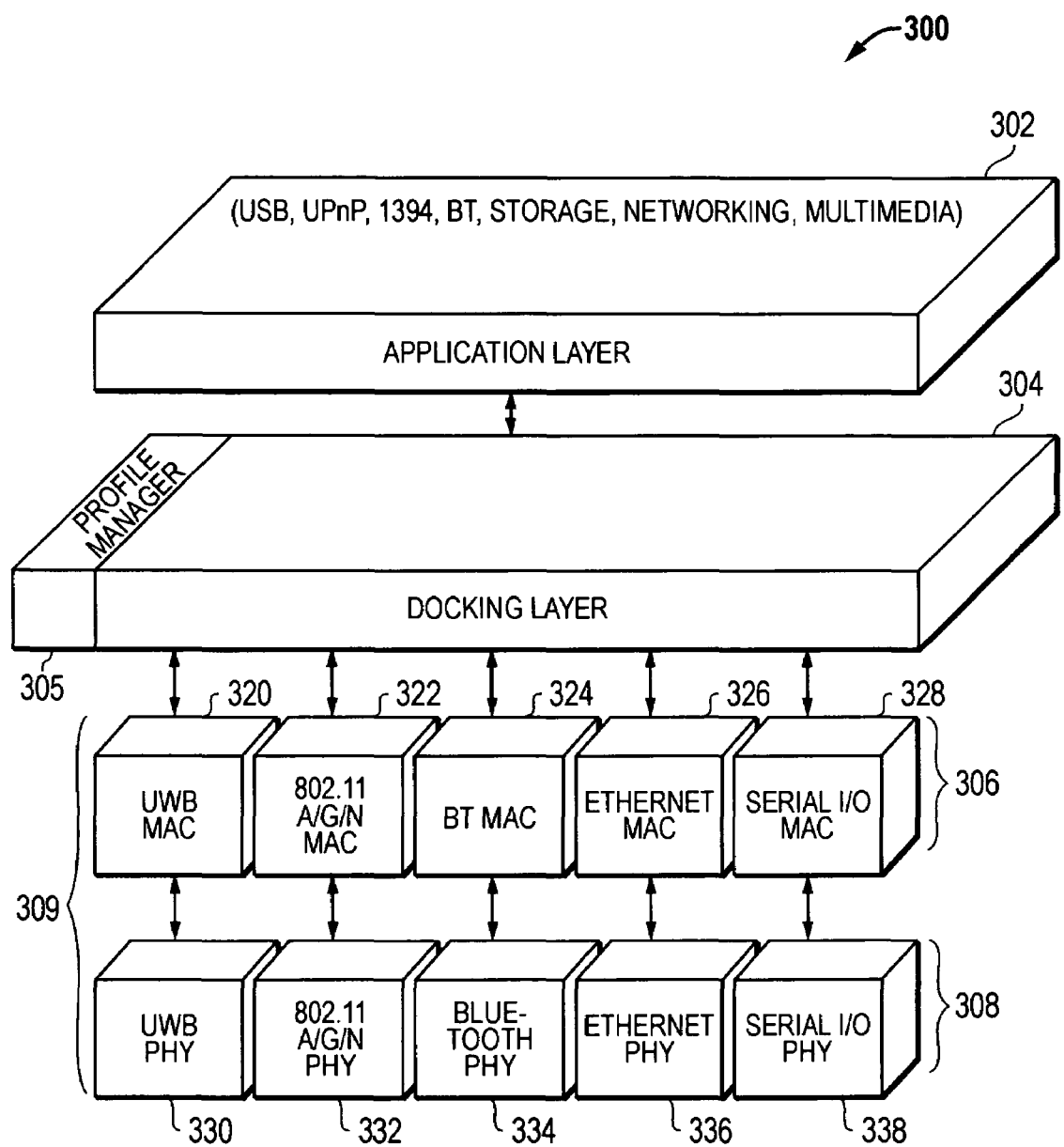
FIG. 3A illustrates communication processing components according to one exemplary embodiment of the disclosed systems and methods.

FIG. 3A illustrates one exemplary embodiment of communication processing components 300 that may be implemented on an information handling system (e.g., portable information handling system 200 of FIG. 2) to provide the wireless docking capabilities described elsewhere herein. As shown in FIG. 3A, communication processing components 300 include a wireless docking manager in the form of a docking layer 304 interposed between application layer 302 and data link layer 306. Although wireless docking capabilities may be described herein in relation to wireless docking manager 304, it will be understood that the same capabilities may be implemented by a wireless docking manager configured in any other suitable form for accomplishing the same. Furthermore, it will be understood that other components may be present between application layer 302 and network interface layer 309, e.g., other ISO software layers.

Still referring to FIG. 3A, application layer 304 may include any one or more applications that are capable of communicating over a wired or wireless network connection. Examples of such applications include, but are not limited to, universal serial bus (USB) applications, universal plug and play (UPnP) applications, IEEE 1394 applications, Bluetooth (BT) applications, storage applications, networking applications, multimedia applications, etc. Interface of docking layer 304 with application layer 302 may be made, for example, through standard software application programming interfaces (APIs) that allow docking layer 304 to be accessed by any of the applications of application layer 302.

As further illustrated in FIG. 3A, example components of data link layer 306 include, but are not limited to, media access control (MAC) layer components such as UWB MAC component 320, 802.11 a/g/n MAC component 322, BT MAC component 324, Ethernet MAC component 326 and Serial I/O MAC component 328, etc., it being understood that layer 306 may include any other type/s of data link layer or other components suitable for interfacing with network media of physical (PHY) layer 308. Physical layer 308 of FIG. 3A is shown including the following example physical layer components that correspond to MAC components of data link layer 306: UWB PHY component 330, 802.11 a/g/n PHY component 332, BT PHY component 334, Ethernet PHY component 336 and Serial I/O PHY component 338, it being understood that layer 308 may include any other type/s of physical layer components. Together, data link layer 306 and physical layer 308 form a network interface layer 309 having network interface components that in the illustrated embodiment are each defined by the combination of a given MAC component of layer 306 (e.g., UWB MAC component 320) and its respective PHY component of layer 308 (e.g., UWB PHY component 330). Interface of docking layer 304 with network interface layer 309 may be made, for example, through the network device drivers with standard APIs being used to allow the device drivers to access docking layer 304.

Still referring to the exemplary embodiment of FIG. 3A, docking layer 304 may be configured to handle peripheral device connectivity and networking connectivity requirements of application layer 302. In this regard, docking layer 304 may be configured to select appropriate components of MAC layer 306 and/or PHY layer 308 based on application bandwidth requirements and/or available network connectivity. For example, if a UWB connection from a wireless docking station to a given external device (e.g., display device) is dropped (e.g., due to distance), docking layer 304 may be configured to dynamically re-route connection with the given external device to one or more other wired or wireless interfaces, such as 802.11 n. Thus, this capability may be implemented in one exemplary embodiment to provide seamless and dynamic connectivity, e.g., for mobile devices, PCs, etc. In another exemplary embodiment, this capability may be implemented to provide the integration of various piconets (overlapping or isolated) of UWB devices through a backbone of 802.11a/g/n links, e.g., one information handling system with connections to UWB peripheral devices may use the 802.11n link to connect to another information handling system with connection to other UWB peripheral devices, allowing the sharing of peripheral devices in different piconets.

To illustrate, assume that portable information handling system 200 of FIG. 2 is connected to television 220 by a wireless UWB connection 210. When this wireless connection is interrupted (e.g., portable information handling system 200 is moved out of UWB communication range from television 220), docking layer 304 may establish an alternate connection between portable information handling system 200 and television 220 using available alternate wireless interface/s that are within communication range. For example, depending on distance between portable information handling system 200, television 220 and cable modem 240, docking layer 304 may establish connection between television 220 and portable information handling system 200 via UWB connection 222 to cable modem 240 and wired connection 218 (e.g., if portable information handling system 200 is within UWB communication range of cable modem 240), or via 802.11 n connection 220 to wireless access point 230, 802.11 n connection 223 and wired connection 218 (e.g., if portable information handling system 200 is out of UWB communication range of cable modem 240 but within 802.11 n communication range of wireless access point 230). In this regard, docking layer 304 may be configured to choose among multiple available interfaces based on one or more connection policies, e.g., preference for an available shorter range higher bandwidth UWB interface over an available longer range lower bandwidth 802.11 n interface.

In operation, docking layer 304 of FIG. 3A may engage a given application of application layer 302 and provide active feedback to the given application that identifies external devices that are currently available for "docking" (e.g., projector, video display, etc.). At this time, the given application (or a user communicating with the given application) may be allowed to choose a given available device for docking, e.g. a set-top box (STB) device and to communicate this choice to docking layer 304. Docking layer 304 may then manage the connectivity between the chosen device and the given application in a manner that is transparent for the given application.

Capabilities of communication processing components that include a wireless docking manager (e.g., docking layer 304 of FIG. 3) may be implemented in one exemplary embodiment to allow automatic selection of the most desirable external device for connection under given circumstances, e.g., based on one or more connection policies that may be defined for specific combinations of applications and available external devices. For example, referring to the exemplary embodiment of FIG. 3, a presentation application (e.g., Microsoft Power Point) of an application layer 302 executing on a notebook computer may be configured to display a presentation on the internal display of the notebook computer as long as docking layer 304 identifies no external projector device is available for docking and connection to the presentation application. When docking layer 304 identifies a projection device that is available for connection, it communicates this information to the presentation application of application layer 302. The presentation application may be configured to automatically select an available projection device for display of the presentation, and to communicate this choice to docking layer 304. Docking layer 304 may in turn manage the connectivity between the presentation application and the projection device in order to display the presentation on the projection device, without the necessity of user choice, although it is also possible that a user may be given the option of approving the connection to the projection device prior to establishing the connection. Upon a failure of the projection device, docking layer 304 may also be configured to switch display of the presentation back to the internal display of the notebook computer (and/or to an alternate display device such as back-up projector), based on connection preference information received from the application and/or based on connection policy information maintained by docking layer 304.

Communication processing components including a wireless docking manager may be implemented in another exemplary embodiment to automatically maintain connection between a given application and a given external device using two or more available interfaces between the external device and the application. For example, still referring to the exemplary embodiment of FIG. 3, if a STB is virtually "docked" over an Ethernet interface to a given application of application layer 302, but the Ethernet connection is broken and the STB device is moved to another room, docking layer 304 may automatically switch connectivity, e.g., to 802.11 n, without noticeable interruption (or glitch) detected at level of the given application. If the STB moves within UWB range, docking layer 304 may automatically switch connectivity to the higher-bandwidth UWB interface. This connectivity management capability of docking layer 304 of FIG. 3A may be implemented to provide "hot-plugging" of devices over wireless connections and, advantageously, in a manner such that the applications of layer 302 don't have to maintain individual interfaces to components of layer 309 and so that operating system (OS) doesn't need to "add the device" each time such a device is docked.

In one exemplary embodiment, a docking manager may be configured to authenticate connection with each external device, without need for authentication by applications of an application layer. For example, docking layer 304 may authenticate a given external device for connectivity with a first interface component of layer 306 (e.g., using standard authentication mechanism/s for the first interface component) and then leverage this authentication by applying it to other interface components of layer 306. At the same time, docking layer 304 may be configured to provide a robust, secure interface to application layer 302 that shields a connected application of layer 302, e.g., from timeouts/delays associated with wireless connectivity.

As further illustrated in FIG. 3A, a docking profile manager 305 may be optionally provided in communication with a wireless docking manager (e.g., such as docking layer 304) and may be configured to, among other things, maintain information concerning characteristics (e.g., authentication information such as encryption codes, connection status, etc.) of external network devices and/or network interfaces, to organize such external devices into various classes or profiles, etc. In this regard, profile manager 305 may be configured to maintain data entries concerning external network devices and particular network interfaces of network interface layer 309 associated therewith. Examples of device classes or profiles that may be maintained by profile manager 305 include, but are not limited to, wireless network devices used at work or wireless network devices used at home, UWB devices only, Bluetooth devices only, etc. Such a docking profile manager may be provided in one embodiment to make the docking experience simpler yet more secure by virtue of the fact that the above-described information may be maintained in one place, so that individual applications do not need to separately maintain and separately process such information. It will be understood that the configuration of communication processing components of FIG. 3A is exemplary only, and that any other configuration of processing layers or logic suitable for implementing a wireless docking manager and accomplishing one or more of the virtual docking features described elsewhere herein may alternatively be employed.

Figure 3B:
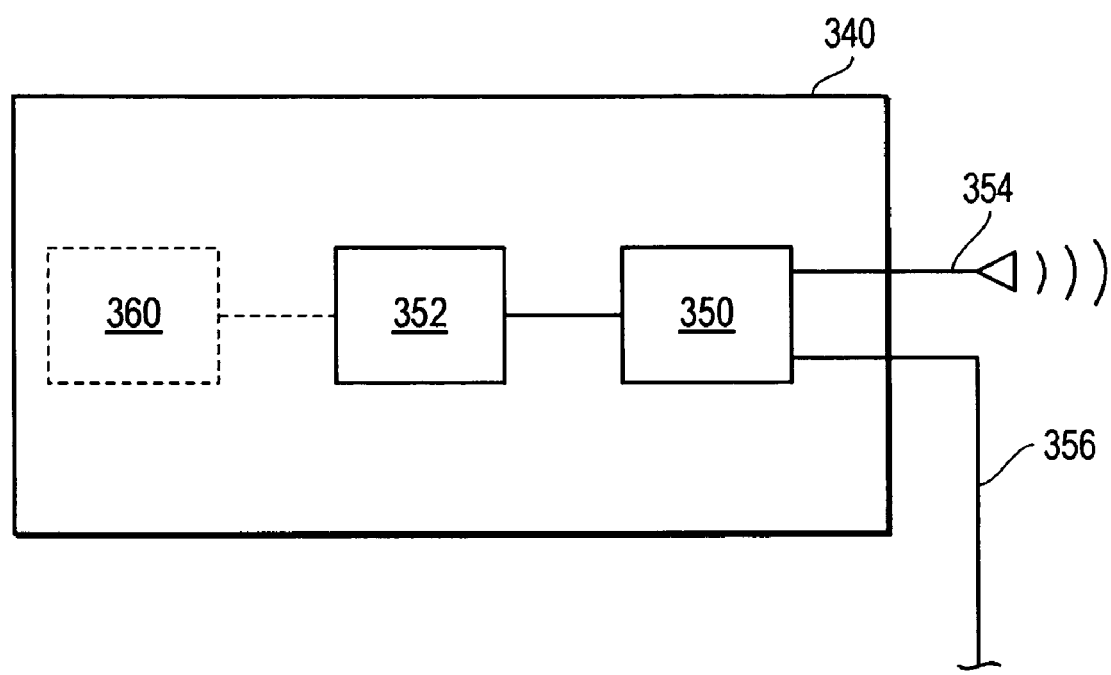
FIG. 3B is a block diagram of an information handling system configured to one exemplary embodiment of the disclosed systems and methods.

FIG. 3B is a block diagram showing an information handling system 340 (e.g., portable information handling system 200 of FIG. 2) as it may be configured according to one exemplary embodiment of the disclosed systems and methods. As illustrated in FIG. 3B, exemplary information handling system 340 includes at least one wireless connection 354 and at least one wired connection 356, each of which are configured for communication to one or more external devices or networks as described elsewhere herein. However, it will be understood that other configurations are possible, e.g., two or more wireless connections may be present and/or that no wired connection may be present. Information handling system 340 also includes a network interface card (NIC) or network adapter 350 that is connected to receive and transmit data to and from connections 354 and 356, it being understood that it is also possible that a separate NIC may be present for each separate wireless and/or wired connection. In one embodiment, NIC 350 may be configured to execute the functions of network interface layer 309 of FIG. 3A.

As further shown in FIG. 3B, information handling system 340 also includes central processor (CPU) 352 in communication with NIC 350. In one exemplary embodiment, an application layer, a wireless docking manager in the form of a docking layer, and a docking profile manager (e.g., such as application layer 302, docking layer 304 and docking profile manager 305 of FIG. 3) may be resident and executing on the central processor 352, although this is not necessary and a docking manager may implemented in NIC 350 or any other alternative suitable processing component. In operation, processor 352 receives and transmits data to and from NIC 350 in a manner that is suitable for accomplishing the features described elsewhere herein. It will be understood that the configuration of FIG. 3B is exemplary only, and that any other configuration of one or more processors and/or software layers suitable for accomplishing one or more of the virtual docking features described elsewhere herein may alternatively be employed. For example, information handling system may also include other components such as optional memory/storage 360, and the functions of processor 352 and NIC 350 may be combined or divided further or in any suitable alternative fashion.

In one exemplary embodiment, support from the graphics sub-system of a portable information handling system (e.g., laptop computer, PDA, etc.) may be employed in conjunction with docking layer 304 to enable superior graphics performance while performing operations for multimedia content over wireless links. In this regard, the docking layer embodiment of FIG. 3A may be particularly desirable to manage device connectivity for relatively high bandwidth connections (e.g., bandwidths of greater than or equal to about 1 Gbps) between applications of layer 302 and external devices such as projectors, displays, surround sound audio, printers, etc. Relatively high bandwidth connections with such device may be supported, for example, using UWB links to portable information handling system 200 (e.g., notebook computer, PDA, etc.). In one exemplary embodiment, PCI Express support for real-time data and quality of service (QoS) may be linked to the QoS implementation over UWB and 802.11 to provide additional robustness. The disclosed systems and methods may also be advantageously implemented in one embodiment in conjunction with Peripheral Component Interconnect Special Interest Group Wireless Form Factor (PCISIG WFF) interface technologies, and highly integrated wireless solutions on information handling system (e.g., notebook, PC, etc.) and peripheral platforms. PCISIG WFF and other such implementations may be implemented in one embodiment to provide highly integrated wireless solutions that leverage the mechanisms provided by the disclosed system and methods. Advantageously, docking layer 304 may scale to provide docking functionality with better MAC/PHY support for smart, cognitive and agile radio architectures of the future.

Figure 4:
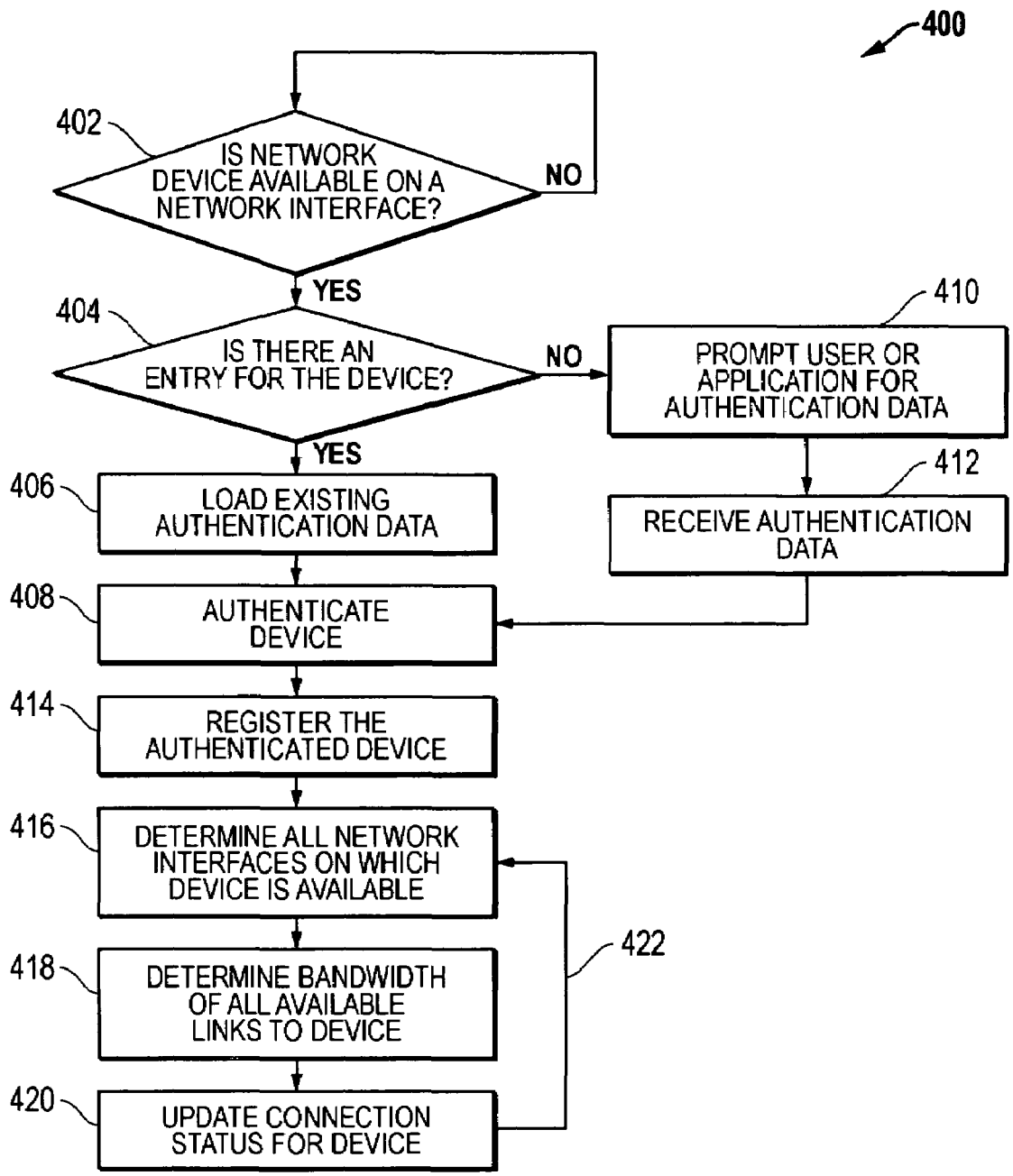
FIG. 4 illustrates methodology that may be employed by a wireless docking manager according to one exemplary embodiment of the disclosed systems and methods.

FIG. 4 illustrates one exemplary embodiment of methodology 400 that may be employed by a wireless docking manager (e.g., docking layer 304 of FIG. 3A) which may be implemented, for example, on an information handling system such as portable information handling system 200 of FIG. 2. In this regard, methodology 400 may be utilized by a docking layer to interact with a network interface layer device driver layer, e.g., network interface layer 309 of FIG. 3A. In step 402 of FIG. 4, the docking layer monitors for the presence of an external network device that is available over a given network interface, e.g., any one of the external network devices illustrated in FIG. 2 that is available over any of the network interfaces of network interface layer 309. Upon detection of a network device that is available over a given network interface, the docking layer checks in step 404 to determine if there is an existing data entry for the network device with reference to the given network interface. Such a data entry may be maintained in any form suitable for access by the docking layer. For example, profile manager 305 of FIG. 3A may be configured to maintain data entries concerning specific external network devices and the particular network interfaces employed by each device, and profile manager 305 may be configured to share this information with docking layer 304. These data entries may include, for example, authentication information, preferred Quality of Service settings, bandwidth requirements, available data rates, latency/jitter characteristics, etc. Data entries concerning specific external network devices and network interfaces associated therewith may be provided to profile manager 305, e.g., by user and/or applications of layer 302.

Still referring to FIG. 4, if there is no existing authentication data entry for the available external device and the given network interface, the docking layer may be configured to prompt an application and/or application user in step 410 to provide authentication data for the device. Examples of such authentication data includes, but is not limited to, data for standard network security protocols such as Wi-Fi Protected Access (WPA) information, Extensible Authentication Protocol (EAP) information, Lightweight Extensible Authentication Protocol (LEAP) information, etc., data for OS/application security mechanisms (e.g., Windows login, network login, etc.), or a combination thereof. Upon receipt of authentication data from application and/or user in step 412, the docking layer authenticates the device according to the proper authentication method in step 414, e.g., using standard network security protocol/s, OS/application security mechanism/s, or a combination thereof. At this time, the authentication information may also be stored (e.g., on profile manager 305) as a data entry for the given device and network interface that may be utilized for future authentication. However, if an existing authentication data entry is found in step 404 for the available external device and the given network interface, then the docking layer may automatically load the existing authentication data in step 406 and then proceed directly to authentication of the device in step 408 without the need for prompting the application or user. Thus, when existing authentication data is available, authentication may proceed more rapidly and in an automated manner.

Once authentication has occurred in step 408, the docking layer registers the authenticated device as an available device in step 414, e.g., docking layer 304 of FIG. 3A may register the authenticated device with profile manager 305. Upon registration of a given device as being available on at least one network interface, a check may be performed in step 416 to determine if the same given device has been registered as available on any other network interface. This check may be performed by a profile manager (e.g., profile manager 305) or any other suitable logic executing on an information handling system, e.g., such as portable information handling system 200 of FIG. 2. The docking layer may then determine available bandwidth of all available link/s to the given device in step 418, and may update the connection status of the given device in step 420, e.g., by providing the current connection status of the given device to a profile manager. As shown in FIG. 4, the docking layer may monitor the connection status and available bandwidth for the given device on a recurring basis, as illustrated by arrow 422.

Figure 5:
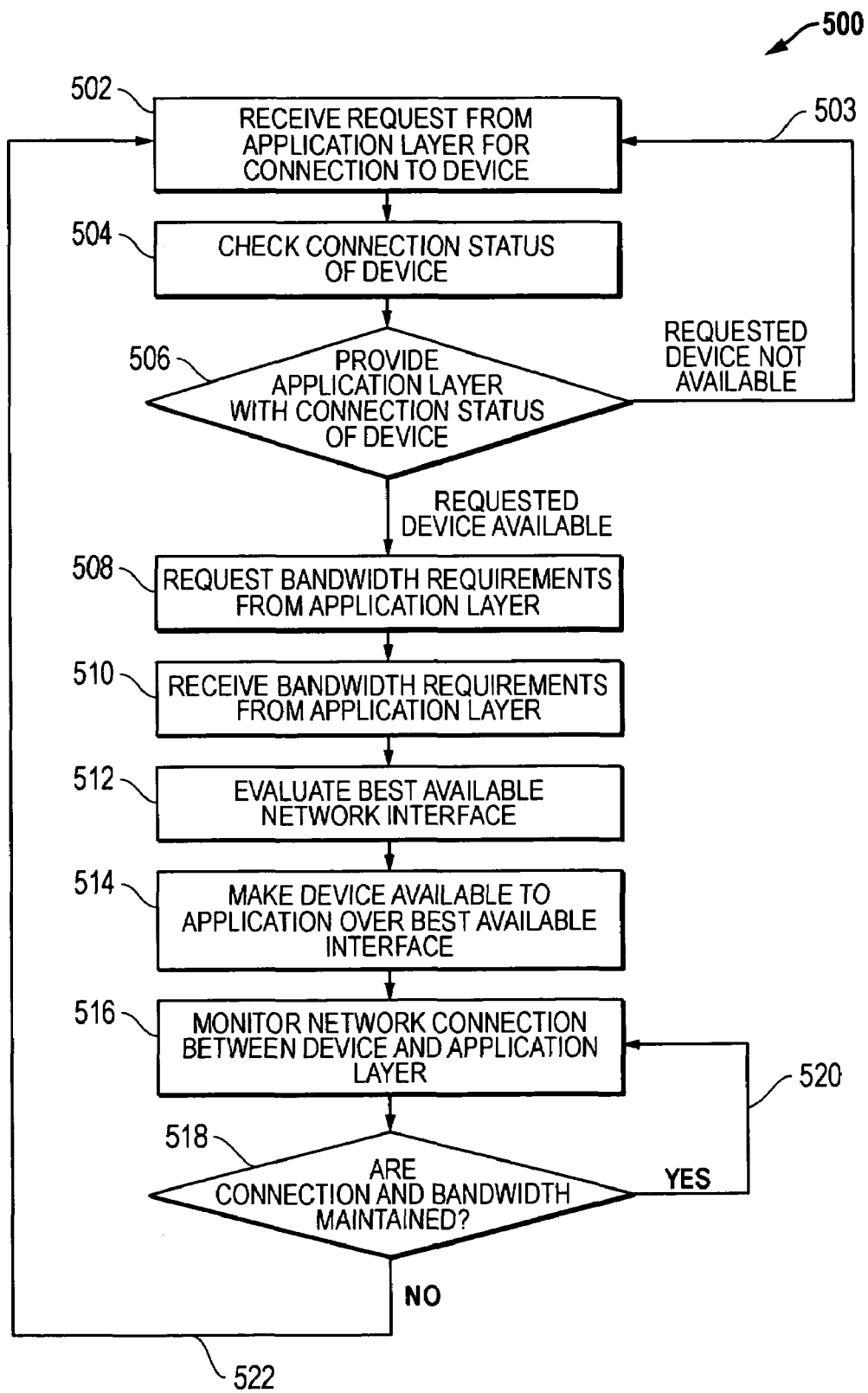
FIG. 5 illustrates methodology that may be employed by a wireless docking manager according to one exemplary embodiment of the disclosed systems and methods.

FIG. 5 illustrates one exemplary embodiment of methodology 500 that may be employed by a wireless docking manager (e.g., docking layer 304 of FIG. 3A) which may be implemented, for example, on an information handling system such as portable information handling system 200 of FIG. 2. In this regard, methodology 500 may be utilized by a docking layer to interact with an application layer, e.g., application layer 302 of FIG. 3A. In step 502 of FIG. 5, the docking layer receives a request from the application layer (e.g., from a given application of application layer 302 of FIG. 3A) for connection to a given external network device. In response to the request of step 502, the docking layer checks on the connection status (available or unavailable for connection) of the given device, e.g., by retrieving connection status information from docking profile manager 305 of FIG. 3A. The docking layer then provides the application layer with connection status of the device (available or unavailable) in step 506. As shown by arrow 503 of FIG. 5, if the requested device is not available methodology 500 returns to step 502 to await another request from the application layer.

Referring now to step 508 of FIG. 5, if the requested device is available, then the docking layer may request bandwidth or data rate requirements from the application layer for connection to the given requested device, and the docking layer may receive these requirements as feedback from the application layer in step 510, although in other embodiments this information may be received from the application layer without a corresponding request from the docking layer. Based at least in part on the bandwidth requirement feedback provided in step 510, the docking layer may evaluate the best network interface available for connection to the given device in step 512. Other parameters besides bandwidth requirement feedback that may be used by the docking layer to evaluate and determine the best network for connection to the given device are network characteristics such as QoS requirements, latency/jitter characteristics, level of authentication, etc. A preference for maintaining a wireless connection over a wired connection (or vice-versa) may also be defined as a policy which the docking layer may use in determining the best available network interface. Based on the evaluation performed in step 512, the docking layer may make choose the best available network interface and make the given device available to the application layer over this interface in step 514.

Still referring to FIG. 5, the docking layer may monitor the status of the existing network connection between the given external network device and the application layer in step 516. As shown, the docking layer continues to monitor the status of this connection as long as the connection and its required bandwidth are found to be maintained in step 518, as represented by arrow 520. However, in the event that the existing network connection to the given external network device is found to be broken (and/or connection bandwidth is unavailable) in step 518, then the docking layer may attempt to make the given device available thorough another and alternate available network interface. For example, methodology 500 may be repeated starting at step 502 so as to confirm continued device availability and to determine the best available network interface for same, as represented by arrow 522.

It will also be understood that the configuration of communication processing components 300 of FIG. 3A is exemplary only, and that any other configuration of communication processing components may be employed that is suitable for implementing one or more of the virtual docking features described elsewhere herein. It will also be understood that the methodologies of FIGS. 4 and 5 are exemplary only, and that the disclosed systems and methods may be implemented using any other methodologies that are suitable for implementing one or more of the virtual docking features described elsewhere herein. In this regard, it will be understood that either of the methodologies of FIGS. 4 and/or 5 may be implemented by varying the order of the illustrated steps and/or by using fewer, additional or alternate steps in any combination that is suitable for implementing one or more of the virtual docking features described elsewhere herein. For example, in one exemplary embodiment, a docking layer (e.g., docking layer 304 of FIG. 3A) may provide an application layer (e.g., application layer 302 of FIG. 3A) with information concerning characteristics of a requested external network device other than the device connection status. Such information may be provided, for example, in response to a request for same from the application layer, e.g., in step 506 of the methodology of FIG. 5. Examples of types of such other information include, but are not limited to, available bandwidth for connection to the requested device and/or a comparison of the characteristics of suitable network interfaces for the requested device.

It will be understood that the disclosed systems and methods may be implemented in heterogeneous or non-heterogeneous network environments that employ one or more wireless communication technologies. Examples of such wireless technologies include, but are not limited to, those technologies listed in Tables 1 and 2. Tables 1 and 2 also list exemplary wireless technology characteristics (e.g., range, data rate), one or more of which may be employed as criteria for the determination of best available wireless connection technology between a given application executing on an information handling system and a given external device.

TABLE 1

Exemplary Wireless Technologies *

| Wireless Technology Type | Specific Wireless Technology Examples | Exemplary Range of Use for Wireless Technology | Exemplary Applications for Wireless Technology | Exemplary Data Rates for Wireless Technology |
|---|---|---|---|---|
| WPAN | Bluetooth UWB RFIDs | <10 meters | Cable Replacement Local Data Sync Device Connectivity Ad-Hoc Connections | 721 Kbps to 1 Gbps |
| WLAN | IEEE 802.11 | <100 meters | Mobile Ethernet Networking Home, Office Hot Spots | 11 Mbps to 100+ Mbps |
| WMAN-WiMax | IEEE 802.16d IEEE 802.16e IEEE 802.20 | <1000 meters | Internet Broadband Access | 10 Mbps to 70 Mbps |
| WWAN/WMAN-3G | GSM/GPRS EDGE W-CDMA 1x-EVDO HSDPA | <1000 meters | Access Anywhere Internet Broadband Access | 40 Kbps to 8 Mbps |

* Acronyms employed in Table 1: UWB (Ultra Wide Band); RFID (Radio Frequency Identification); GSM (Global System for Mobile Communications); GPRS (General Packet Radio Service); EDGE (Enhanced Data Rates for Global Evolution); W-CDMA (Wideband Code Division Multiple Access); EVDO (Evolution Data Only); HSDPA (High Speed Downlink Packet Access).

TABLE 2

Example WLAN Characteristics **

| IEEE Std. | 802.11b | 802.11g | 802.11a | 802.11n |
|---|---|---|---|---|
| Freq. Band | 2.4 GHz | 2.4 GHz | 5 GHz | 2.4 GHz/5 GHz |
| # Channels | 3 | 3 | 19-23 | 3, 19-23 |
| Data Rate | 11 Mbps | 54 Mbps | 54 Mbps | >100 Mbps |
| Range | 100 m | 100 m | 100 m | 100 m |
| Applications | Data Voice Internet | Data Voice Internet | Voice, data Video (Controlled QoS) | Data, voice Multi-media streaming |
| Security | WPA WEP CCX1 802.1x 802.11i | WEP WPA CCX1 802.1x 802.11i | WEP WPA/WPA2 CCX1 802.1x 802.11i | WEP WPA/WPA2 802.11x 802.11i AES |

** Acronyms employed in Table 2: WEP (Wired Equivalent Privacy); WPA (Wi-Fi Protected Access); CCX (Cisco Compatible Extensions); AES (Advanced Encryption Standard)

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. An information handling system comprising communication processing components and multiple external peripheral devices, said communication processing components comprising one or more applications and a wireless docking manager configured to manage connectivity between said one or more applications and said multiple external peripheral devices;

wherein each of said multiple external peripheral devices comprise at least one of an optical drive, a storage device, a display, a mouse, a keyboard, a printer, a projector, or a webcam;

wherein said wireless docking manager is configured to manage connectivity between said information handling system and said multiple external peripheral devices by managing simultaneous communication between said one or more applications and said multiple external peripheral devices by dynamically selecting particular combinations of MAC layer and PHY layer components from multiple available combinations of MAC layer and PHY layer components for implementing simultaneous communication between said one or more applications and said multiple external peripheral devices over selected wired or wireless connections; and wherein said docking manager is a notebook computer to manage communication between an application layer and one of said external peripheral devices that is an external projector device; and wherein said docking manager only displays an application on either an internal display of said notebook computer or said external projector device.

2. The information handling system of claim 1, wherein said communication processing components further comprise a docking profile manager in communication with said wireless docking manager, said docking profile manager being configured to organize said multiple external peripheral devices into multiple device classes, a first one of said multiple device classes representing identity of one or more of said multiple external peripheral devices used at a first fixed location and a second one of said multiple device classes representing identity of one or more of said multiple external peripheral devices used at a second and different fixed location.

3. The information handling system of claim 2, wherein said first fixed location is a work location; and wherein said second fixed location is a home location.

4. The information handling system of claim 1, wherein said wireless docking manager is further configured to:
communicate information to said one or more applications identifying multiple external peripheral devices that are currently available for connection to said one or more applications; and
manage connectivity between said one or more applications and multiple external peripheral devices that are chosen by said one or more applications or a user of said one or more applications.

5. The information handling system of claim 1, wherein said wireless docking manager is configured to dynamically select a particular combination of MAC layer and PHY layer components from multiple available MAC layer and PHY layer components for communication between each given one of said one or more applications and a corresponding given one of said multiple external peripheral devices over a selected wired or wireless connection based at least in part on characteristics of available external peripheral devices, characteristics of available wired and wireless connections, or a combination thereof.

6. The information handling system of claim 1, wherein said wireless docking manager is configured to dynamically select a particular combination of MAC layer and PHY layer components from multiple available combinations of MAC layer and PHY layer components for implementing communication between each given one of said one or more applications and a corresponding given one of said multiple external peripheral devices over a selected wired or wireless connection based at least in part on bandwidth requirement information.

7. The information handling system of claim 1, wherein said wireless docking manager is configured to automatically maintain connection between each given one of said one or more applications and each corresponding given one of said external peripheral devices by dynamically re-routing connection between said given one of said applications and said corresponding given one of said external peripheral devices by changing the particular combination of MAC layer and PHY layer components used for implementing communication between said given one of said applications and said corresponding given one of said multiple external peripheral devices over a different selected wired or wireless connection.

8. The information handling system of claim 1, wherein said wireless docking manager is configured to automatically authenticate connection between said one or more applications and said multiple external peripheral devices without prompting an application or user.

9. The information handling system of claim 1, wherein said wireless docking manager is configured to dynamically select a particular combination of MAC layer and PHY layer components from multiple available combinations of MAC layer and PHY layer components for implementing communication between each given one of said one or more applications and a corresponding given one of said multiple external peripheral devices over a selected wired or wireless connection based at least in part on one or more connection policies.

10. The information handling system of claim 1, wherein said wireless docking manager is further configured to automatically select a second one of said one or more peripheral devices; and to automatically switch existing communications between one or more of said applications and a first one of said multiple external peripheral devices to communications between said one or more of said applications and said second one of said multiple external peripheral devices.

11. The information handling system of claim 1, wherein said wireless docking manager is configured to manage connectivity between said information handling system and said multiple external peripheral devices over inactive and active wireless and wired connections by monitoring the availability status of said wireless and wired connections and dynamically selecting a particular combination of MAC layer and PHY layer components from multiple available combinations of MAC layer and PHY layer components for implementing communication between each given one of said one or more applications and a corresponding given one of said multiple external peripheral devices over a selected monitored available wired or wireless connection.

12. The information handling system of claim 11, wherein said wireless docking manager is configured to manage connectivity between said information handling system and said multiple external peripheral devices over said inactive and active wireless and wired connections by:
receiving a request from each given one of said one or more applications for connection to said corresponding given one of said multiple external peripheral devices;
determining the availability status of said corresponding given one of said multiple external peripheral devices; and then either:
dynamically selecting a particular combination of MAC layer and PHY layer components from multiple available combinations of MAC layer and PHY layer components for implementing communication between each given one of said one or more applications and said corresponding given one of said multiple external peripheral devices over a selected monitored available wired or wireless connection based on bandwidth or data rate requirements provided to said docking manager by each given one of said one or more applications if said corresponding given one of said multiple external peripheral devices is determined to be available, or
not selecting a particular combination of MAC layer and PHY layer components from multiple available combinations of MAC layer and PHY layer components for implementing communication between each given one of said one or more applications and said corresponding given one of said external peripheral devices if said corresponding given one of said multiple external peripheral devices is determined to be unavailable.

13. An information handling system comprising communication processing components and multiple external peripheral devices, said communication processing components comprising:
- an application layer;
- multiple combinations of MAC layer and PHY layer components, each of said combinations of MAC layer and PHY layer components configured to implement communication between said application layer and a corresponding given one of said multiple external peripheral devices over a given wired or wireless connection to enable simultaneous communication between said application layer and each of said multiple external peripheral devices; and
- a wireless docking manager communicating between said application layer and said multiple combinations of MAC layer and PHY layer components;
- wherein said multiple external peripheral devices comprise at least one of an optical drive, an external storage device, a display, a mouse, a keyboard, a printer, a projector, a webcam, or a combination thereof; and
- wherein said docking manager is a notebook computer to manage communication between an application layer and one of said external peripheral devices that is an external projector device; and wherein said docking manager only displays an application on either an internal display of said notebook computer or said external projector device.

14. The information handling system of claim 13, wherein said application layer comprises one or more applications; wherein at least one of said combination of MAC layer and PHY layer components is configured to implement communication between said application layer and a first one of said multiple external peripheral devices over a given wireless connection; wherein at least one of said combination of MAC layer and PHY layer components is configured to implement communication between said application layer and a second one of said multiple external peripheral devices over a given wireless connection; and wherein said wireless docking manager comprises a docking layer.

15. The information handling system of claim 13, wherein said communication processing components further comprise a docking profile manager in communication with said wireless docking manager, said docking profile manager being configured to organize said multiple peripheral devices into multiple device classes, a first one of said multiple device classes representing identity of one or more of said multiple peripheral devices used at a first fixed location and a second one of said multiple device classes representing identity of one or more of said multiple external peripheral devices used at a second and different fixed location.

16. The information handling system of claim 15, wherein said first fixed location is a work location; and wherein said second fixed location is a home location.

17. A method of managing communication between one or more applications and multiple external peripheral devices by using a wireless docking manager to dynamically select a particular combination of MAC layer and PHY layer components from multiple available combinations of MAC layer and PHY layer components for implementing simultaneous communication between each given one of said one or more applications and a corresponding given one of said multiple external peripheral devices over a selected wired or wireless connection; wherein said one or more applications and said multiple available combinations of MAC layer and PHY layer components comprise communication processing components of an information handling system; and wherein each one of said multiple external peripheral devices comprise at least one of an optical drive, an external storage device, a display, a mouse, a keyboard, a printer, a projector, or a webcam; and wherein said docking manager is a notebook computer to manage communication between an application layer and one of said external peripheral devices that is an external projector device; and wherein said method further comprises managing communication between said application layer and said external projector device to only display an application on either an internal display of said notebook computer or said external projector device.

18. The method of claim 17, further comprising:
- using said wireless docking manager to communicate information to said one or more applications identifying said multiple external peripheral devices that are currently available for connection to said one or more applications; and
- using said wireless docking manager to manage connectivity between said one or more applications and said multiple external peripheral devices that are chosen by said one or more applications or a user of said one or more applications.

19. The method of claim 17, further comprising using said wireless docking manager to dynamically select a particular combination of MAC layer and PHY layer components from multiple available MAC layer and PHY layer components for communication between each given one of said one or more applications and a corresponding given one of said multiple external peripheral devices over a selected wired or wireless connection based at least in part on characteristics of available external peripheral devices, characteristics of available wired and wireless connections, or a combination thereof.

20. The method of claim 17, further comprising using said wireless docking manager to dynamically select a particular combination of MAC layer and PHY layer components from multiple available MAC layer and PHY layer components for communication between each given one of said one or more applications and a corresponding given one of said multiple external peripheral devices over a selected wired or wireless connection based at least in part on bandwidth requirement information provided by said first one of said applications.

21. The method of claim 17, further comprising using said wireless docking manager to automatically maintain connection between each given one of said one or more applications and each corresponding given one of said external peripheral devices by dynamically re-routing connection between said given one of said applications and said corresponding given one of said multiple external peripheral devices by changing the particular combination of MAC layer and PHY layer components used for implementing communication between said given one of said applications and said corresponding given one of said multiple external peripheral devices over a different selected wired or wireless connection.

22. The method of claim 17, further comprising using said wireless docking manager to automatically authenticate connection between said one or more applications and said multiple external peripheral devices without prompting an application or user.

23. The method of claim 17, further comprising using said wireless docking manager to dynamically select a particular combination of MAC layer and PHY layer components from multiple available combinations of MAC layer and PHY layer components for implementing communication between each given one of said one or more applications and a corresponding given one of said multiple external peripheral devices over a selected wired or wireless connection based at least in part on one or more connection policies.

24. The method of claim 17, further comprising using said wireless docking manager to automatically select a second one of said one or more peripheral devices; and to automatically switch existing communications between one or more of said applications and a first one of said multiple external peripheral devices to communications between said one or more of said applications and said second one of said multiple external peripheral devices.

25. The method of claim 17, wherein said communication processing components further comprise a docking profile manager in communication with said wireless docking manager, and wherein said method further comprises using said docking profile manager to organize said multiple peripheral devices into multiple device classes, a first one of said multiple device classes representing identity of one or more of said multiple external peripheral devices used at a first fixed location and a second one of said multiple device classes representing identity of one or more of said multiple external peripheral devices used at a second and different fixed location.

26. The method of claim 25, wherein said first fixed location is a work location; and wherein said second fixed location is a home location.

27. The method of claim 17, further comprising using said wireless docking manager to manage connectivity between said information handling system and said multiple external peripheral devices over inactive and active wireless and wired connections by monitoring the availability status of said wireless and wired connections and dynamically selecting a particular combination of MAC layer and PHY layer components from multiple available combinations of MAC layer and PHY layer components for implementing communication between each given one of said one or more applications and a corresponding given one of said multiple external peripheral devices over a selected monitored available wired or wireless connection.

28. The method of claim 27, further comprising using said wireless docking manager to manage connectivity between said information handling system and said multiple external peripheral devices over said inactive and active wireless and wired connections by:
receiving a request from each given one of said one or more applications for connection to said corresponding given one of said multiple external peripheral devices;
determining the availability status of said corresponding given one of said multiple external peripheral devices; and then either:
dynamically selecting a particular combination of MAC layer and PHY layer components from multiple available combinations of MAC layer and PHY layer components for implementing communication between each given one of said one or more applications and said corresponding given one of said multiple external peripheral devices over a selected monitored available wired or wireless connection based on bandwidth or data rate requirements provided to said docking manager by each given one of said one or more applications if said corresponding given one of said multiple external peripheral devices is determined to be available, or
not selecting a particular combination of MAC layer and PHY layer components from multiple available combinations of MAC layer and PHY layer components for implementing communication between each given one of said one or more applications and said corresponding given one of said external peripheral devices if said corresponding given one of said external peripheral devices is determined to be unavailable.

29. An information handling system comprising communication processing components and one or more external peripheral devices, said communication processing components comprising one or more applications and a wireless docking manager configured to manage connectivity between said one or more applications and said one or more external peripheral devices;
wherein said one or more external peripheral devices comprise at least one of an optical drive, a storage device, a display, a mouse, a keyboard, a printer, a projector, a webcam, or a combination thereof;
wherein said wireless docking manager is configured to manage connectivity between said information handling system and said one or more external peripheral devices by managing communication between said one or more applications and said one or more external peripheral devices by dynamically selecting a particular combination of MAC layer and PHY layer components from multiple available combinations of MAC layer and PHY layer components for implementing communication between a given one of said applications and a given one of said external peripheral devices over a selected wired or wireless connection; and
wherein said docking manager is a notebook computer to manage communication between an application layer and an external peripheral device, said external peripheral device being an external projector device; and wherein said docking manager only displays an application on either an internal display of said notebook computer or said external projector device.

30. An information handling system comprising communication processing components and one or more external peripheral devices, said communication processing components comprising:
an application layer;
multiple combinations of MAC layer and PHY layer components, each of said combinations of MAC layer and PHY layer components configured to implement communication between said application layer and a given one of said external peripheral devices over a given wired or wireless connection; and
a wireless docking manager communicating between said application layer and said multiple combinations of MAC layer and PHY layer components;
wherein said one or more external peripheral devices comprise at least one of an optical drive, an external storage device, a display, a mouse, a keyboard, a printer, a projector, a webcam, or a combination thereof; and
wherein said docking manager is a notebook computer to manage communication between an application layer and an external peripheral device, said external peripheral device being an external projector device; and wherein said docking manager only displays an application on either an internal display of said notebook computer or said external projector device.

31. A method of managing communication between one or more applications and one or more external peripheral devices by using a wireless docking manager to dynamically select a particular combination of MAC layer and PHY layer components from multiple available combinations of MAC layer and PHY layer components for implementing communication between a given one of said applications and a given one of said external peripheral devices over a selected wired or wireless connection; wherein said one or more applications and said multiple available combinations of MAC layer and PHY layer components comprise communication processing components of an information handling system; wherein said one or more external peripheral devices comprise at least one of an optical drive, an external storage device, a display, a mouse, a keyboard, a printer, a projector, a webcam, or a combination thereof; and wherein said docking manager is a notebook computer to manage communication between an application layer and an external peripheral device, said external peripheral device being an external projector device; and wherein said method further comprises managing communication between said application layer and said external projector device to only display an application on either an internal display of said notebook computer or said external projector device.

* * * * *

UNITED STATES PATENT AND TRADEMARK OFFICE
CERTIFICATE OF CORRECTION

PATENT NO. : 7,590,075 B2
APPLICATION NO. : 11/106779
DATED : September 15, 2009
INVENTOR(S) : Pirzada et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 527 days.

Signed and Sealed this

Twenty-first Day of September, 2010

David J. Kappos
*Director of the United States Patent and Trademark Office*